FIG.I.

March 31, 1936.  M. MAUL  2,036,064

ELECTRICAL TABULATOR

Filed Nov. 2, 1929   10 Sheets-Sheet 2

Inventor
Michael Maul
By his Attorney
W. M. Wilson

March 31, 1936.　　　　M. MAUL　　　　2,036,064
ELECTRICAL TABULATOR
Filed Nov. 2, 1929　　　10 Sheets-Sheet 3

Inventor
Michael Maul
By his Attorney
W. M. Wilson

March 31, 1936.  M. MAUL  2,036,064
ELECTRICAL TABULATOR
Filed Nov. 2, 1929    10 Sheets-Sheet 5

Inventor
Michael Maul
By his Attorney
W. M. Wilson

March 31, 1936.  M. MAUL  2,036,064
ELECTRICAL TABULATOR
Filed Nov. 2, 1929   10 Sheets-Sheet 6

Inventor
Michael Maul
By his Attorney
W. M. Wilson

March 31, 1936. M. MAUL 2,036,064
ELECTRICAL TABULATOR
Filed Nov. 2, 1929 10 Sheets-Sheet 7

Inventor
Michael Maul
By his Attorney
W. M. Wilson

March 31, 1936.                M. MAUL                      2,036,064
                         ELECTRICAL TABULATOR
                         Filed Nov. 2, 1929              10 Sheets-Sheet 8
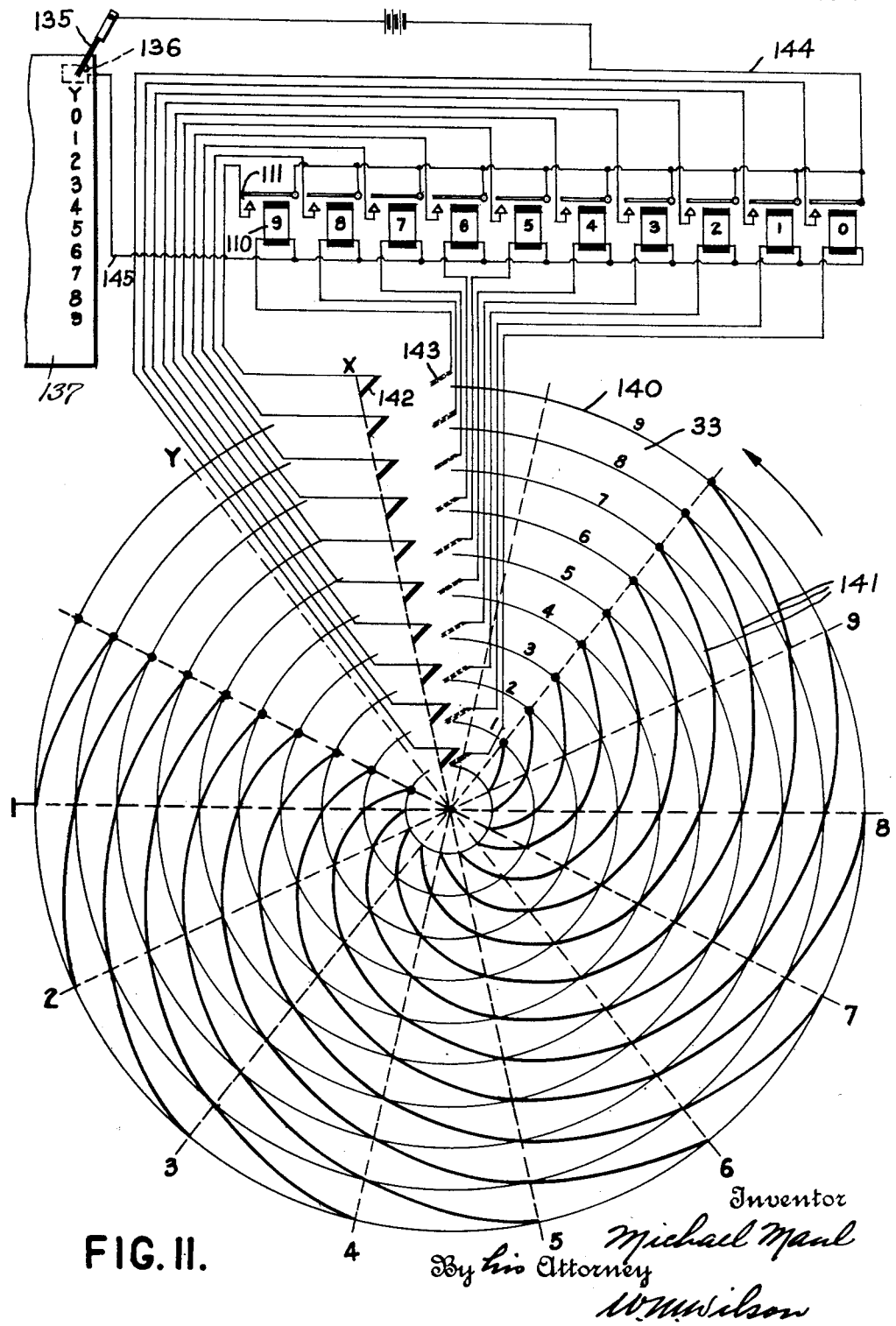
FIG. II.

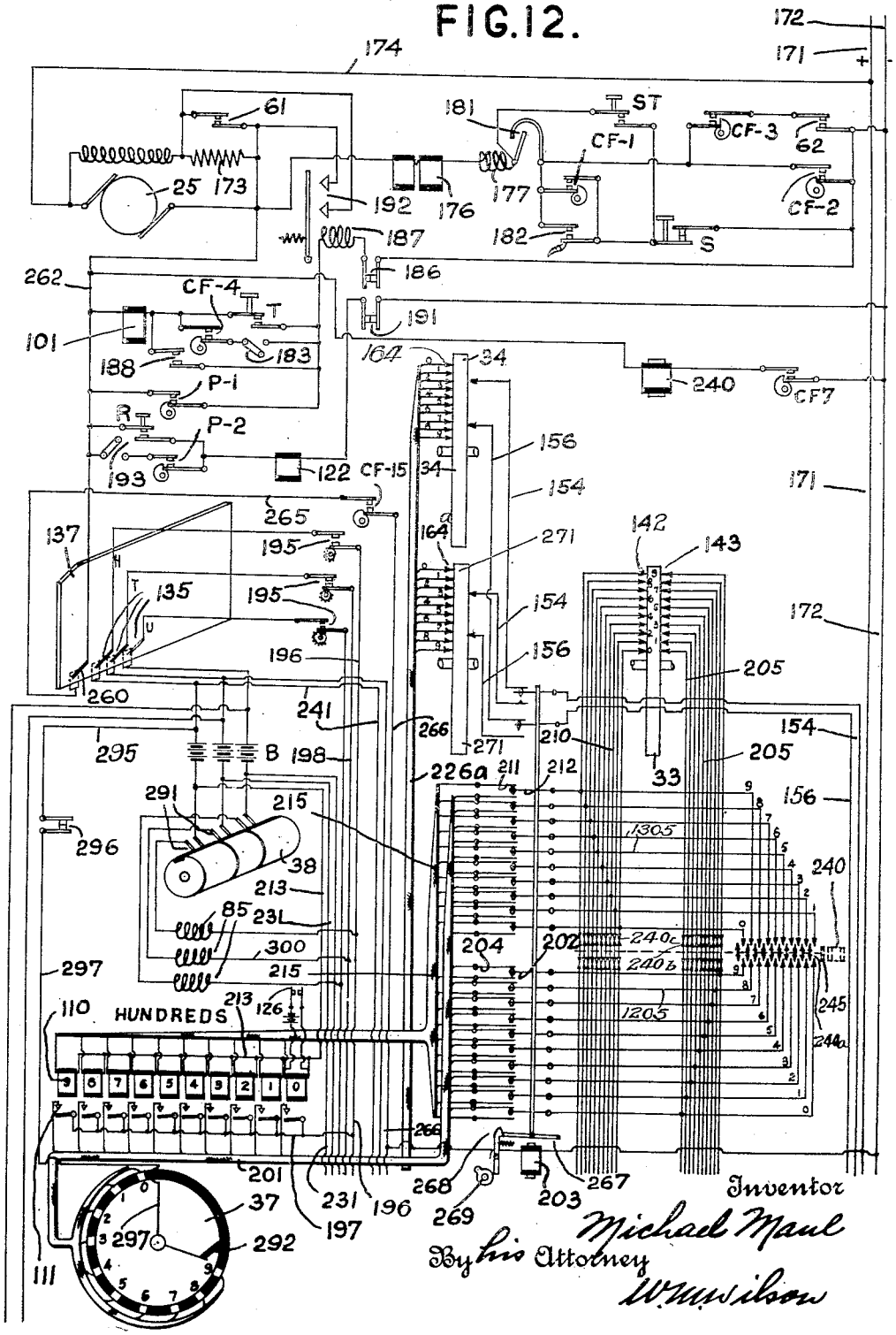

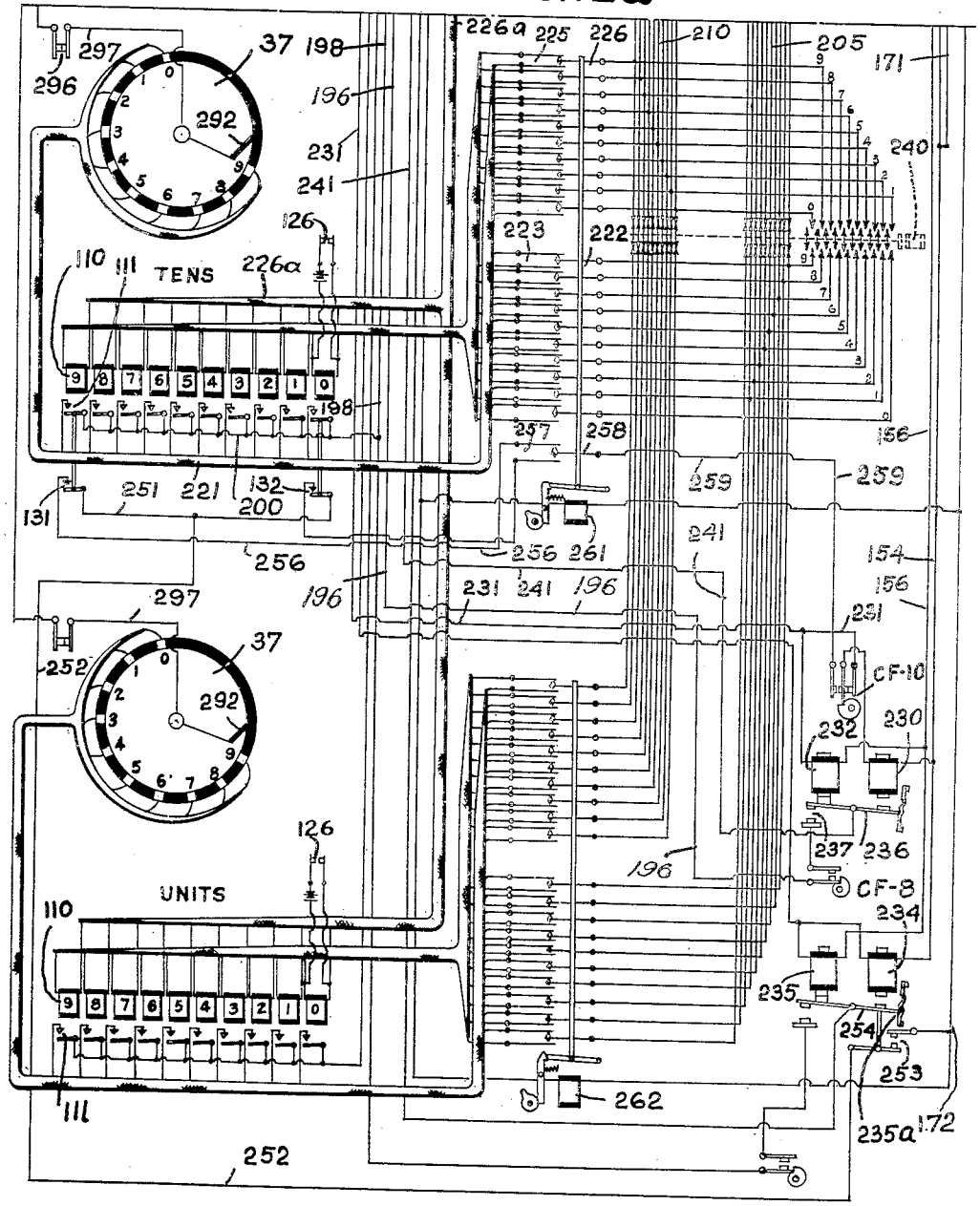

Patented Mar. 31, 1936

2,036,064

UNITED STATES PATENT OFFICE 2,036,064

ELECTRICAL TABULATOR

Michael Maul, Berlin, Germany, assignor, by mesne assignments, to International Business Machines Corporation, New York, N. Y., a corporation of New York Application November 2, 1929, Serial No. 404,384

21 Claims. (Cl. 235—92)

The invention relates to accounting machines and has for its principal object the application of a strictly electrical accumulating device to accounting machines in which the several denominational orders of a multi-denominational number are entered into the accounting device concurrently.

A more specific object of the invention is the application of a strictly electric accumulating mechanism to a record controlled accounting machine.

Still another object of the invention is to simplify the construction of an accumulating device for machines of the above type so that the rotating and mechanically operating parts heretofore necessary for accumulating operations may be dispensed with.

Another object of the invention is to provide a record controlled tabulator having purely electrical accumulating mechanism but in which nevertheless the usual listing, total printing and resetting operations may be performed in all manners heretofore found necessary or desirable in machines of this type.

Another object of the invention is to provide a strictly electrical accumulating mechanism in the above adaptations which is capable of subtracting.

Tabulating machines of the Hollerith type are controlled from record cards on which numbers may be represented by perforations differentially located to represent the several digits. Each column of a card ordinarily represents a denominational order and to accommodate a decimal system of numbers each column is provided with ten positions progressively spaced from the edge of the card to represent the ten digits.

The machine is provided with electrical brushes known as analyzing brushes, one for each column of the card, and the card is fed beneath the brushes with a constant motion so that when any brush encounters a perforation in any position representing a digit, an electric circuit will be closed at a time in the machine cycle corresponding to the digit in question, thereby effecting a differentially timed electrical impulse which operates the accumulating and printing mechanism.

According to the present invention the usual rotating counters or accumulators are replaced by a series of relay controlled circuits. In its mechanical construction the accumulator is provided with a series of ten magnets for each denominational order, each magnet being provided with a pair of contacts. Each magnet in a series pertains to a particular digit and when energized closes its contacts to manifest the particular digit which it represents. A particular closed circuit, then, is the fundamental manifestation of each digit which is entered into the accumulator. Addition is effected by shifting the circuit connections so that the closed contact representing a digit is taken as the datum governing the contact which will be closed when another digit is entered. For example, if the accumulator has its zero contact closed, it prepares a circuit through the other relays so that the entry of three, for example, will close the contacts of the No. 3 relay and open those of the zero relay. This incidentally makes the circuit of the No. 3 relay the basic circuit so that if another number is entered, for example five, the No. 8 relay will be energized to close its contacts representing eight or the sum of three and five.

The arrangement according to the present invention is such that the several denominational orders of the electric counter may be controlled concurrently as is essential in the present commercial type of tabulating machines, and suitable transfer mechanism is provided so that true additions involving figures of several denominational orders may be entered from controlling record cards. Subtraction is effected in a similar manner except that the circuits are selected so that the shifting of them on a digit entry is representative of a subtracting operation.

The invention is illustrated in an exemplary embodiment in the accompanying drawings in which Fig. 1 shows a complete machine arranged with electric counters according to the present invention;

Fig. 11 is a view similar to Fig. 10 illustrating the manner in which subtraction is effected; and Figs. 12 and 12a, of which Fig. 12 should be placed above Fig. 12a, form a complete circuit diagram of the machine.

Figure 1:
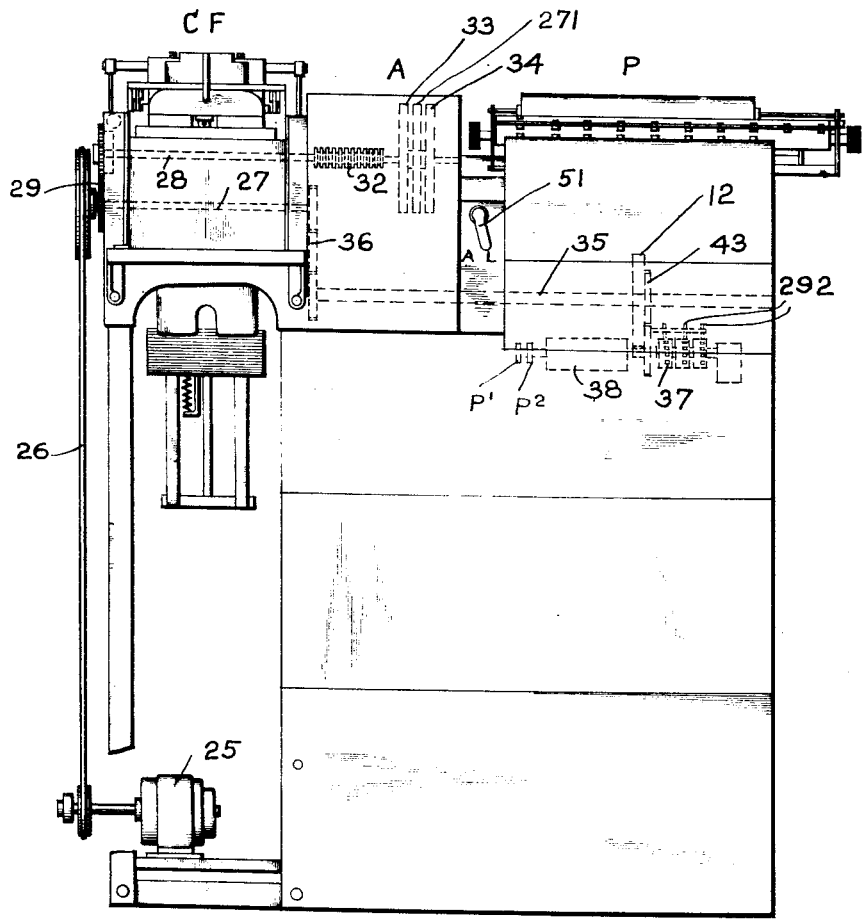

Referring to Fig. 1 the machine is driven by an electric motor 25 which, through suitable pulleys and belt indicated generally at 26, operates the main drive shaft 27 of the machine. The card feed section CF is similar to that ordinarily used on machines of this type and fully illustrated and described in U. S. Patent to Lake, 1,600,413. The card feed mechanism serves to feed cards one at a time from a magazine or hopper to the analyzing brushes of the machine so that they may individually control the adding and printing mechanisms. The card feed is operated by shaft 28 which may be driven from the main drive shaft 27 through suitable gearing 29, the usual electromagnetically controlled one revolution clutch being inserted in the train so that the energization of a card feed clutch magnet will cause the card feed shaft 28 to operate for complete machine cycles. Fixed to the card feed shaft are the usual card feed cams indicated generally at 32 which serve to open and close contacts essential to the operation of certain circuits during the card feed. The contacts operated by these cams will be identified by the letters CF. Also fixed to the card feed shaft are three commutators 33, 34 and 271, of which 33 is hereinafter referred to as the counter commutator and 34 and 271 as the adding and subtracting transfer commutators respectively. The function of these commutators will be explained later. It will be understood that as long as the card feed clutch is engaged any cards which are in the card feed section will feed one by one beneath the analyzing brushes, and the card feed contact cams 32 and the commutators 33, 34 and 271 will operate.

The card feed cams and the commutators 33, 34 and 271 are the only rotating parts directly entering into the accumulating operation whereby considerable mechanical simplification of the machine is obtained in the accumulating section.

The machine is further simplified in that a single print shaft 35 is provided for both listing and totaling. This shaft is driven constantly from the main drive shaft 27 by a gear train designated generally at 36. A one revolution clutch is selectively operated so that the printing mechanism may be driven from the print shaft either in conjunction with the card feed drive shaft or independently of card feed operation. The printing mechanism, through suitable gearing, also drives a commutator 38 which is utilized to open the printing circuits when the machine is not set up for printing operations. A set of brushes 292 cooperating with stationary commutators 37 is also driven from the printing mechanism to effect totaling as will be explained later.

Figure 2:
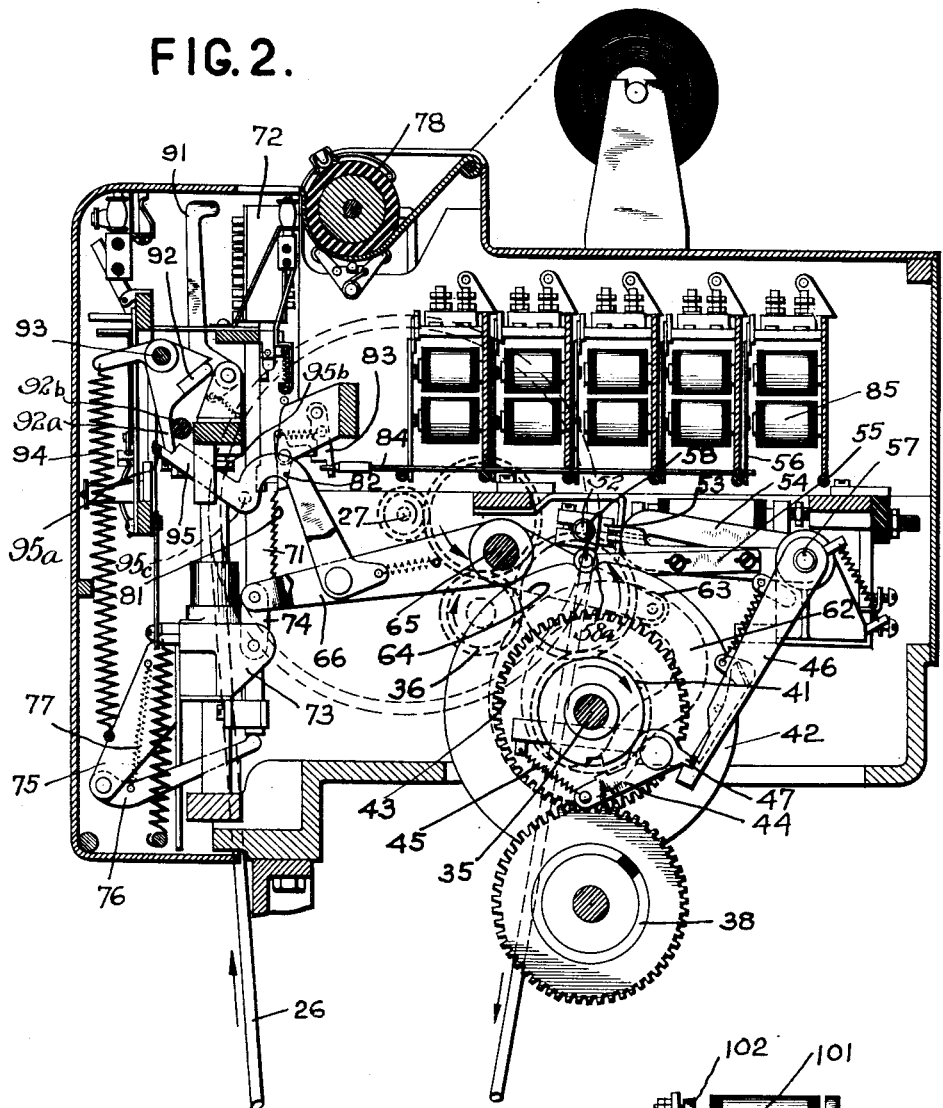
Fig. 2 is a section through the printing mechanism of the machine.
Figure 4:
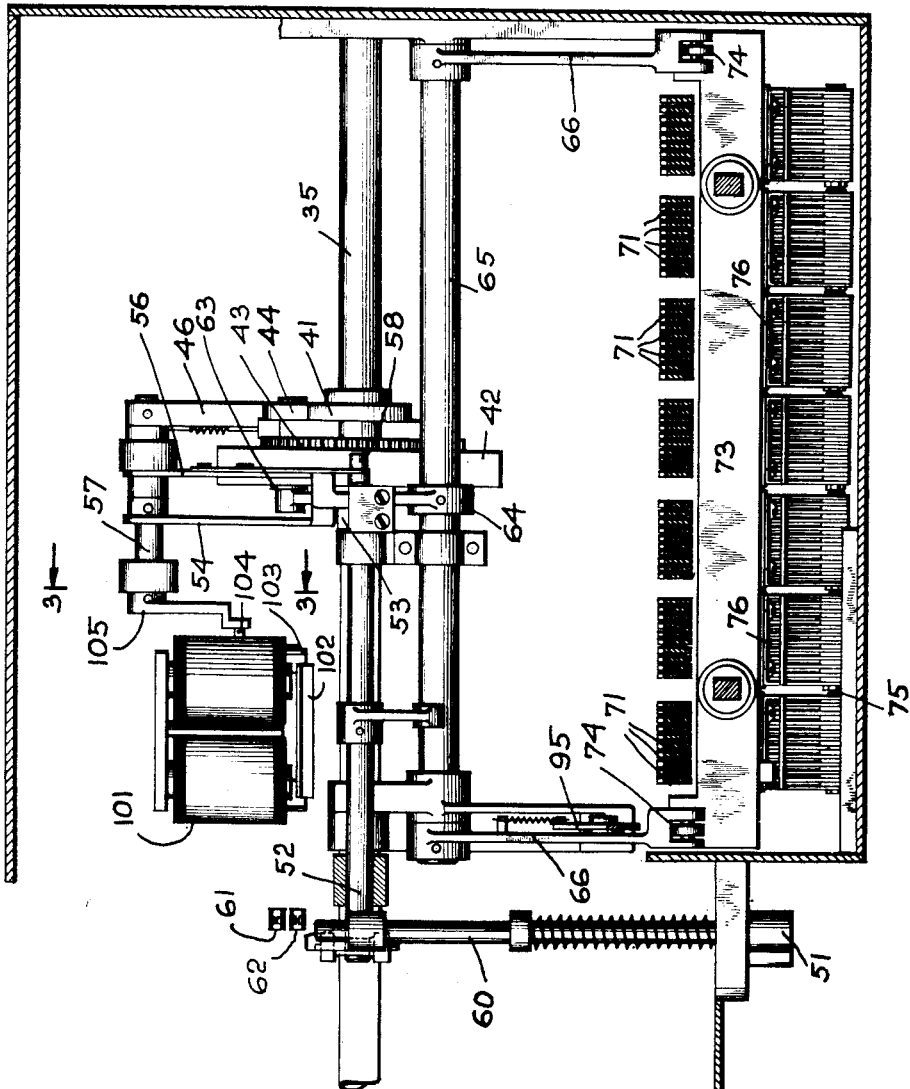
Fig. 4 is a plan view in section of the printing mechanism shown in vertical section in Fig. 2.

The printing mechanism illustrated particularly in Figs. 2 and 4 is entirely similar to that ordinarily used in machines of this type as illustrated in the copending application of Daly and Page, Serial No. 6,980, filed February 5, 1925, now issued as Patent No. 1,762,145, June 10, 1930, but is modified so that the single print shaft 35 operates the type bars for both listing and totaling operations. A disk 41, provided with a single notch in its periphery, is fixed on the print shaft 35, and is constantly driven from the main drive shaft 27 through a train of gears 36.

Figure 2A:
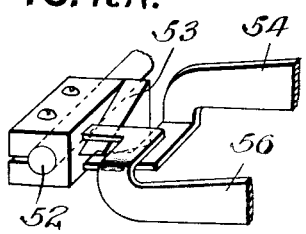
Fig. 2A is a detail of certain parts of the printing mechanism.

A box cam 42 is freely mounted on the print shaft and provided with an attached gear 43 for driving the commutator 38 and the brushes 40 as previously explained. Pivoted to the gear 43 is a pawl 44 having an extension for engaging the notch in disk 41 and urged to do so by a spring 45. Such engagement may be prevented by a latch 46 spring operated to normally engage the tail piece 47 on the pawl 44, and as long as the tail piece of the pawl is thus latched the rotation of the main drive shaft does not effect rotation of the printing cam 42. But when the latch 46 is rocked to release the pawl 44, the latter engages the notch in disk 41 and drives the box cam 42. During adding operations of the machine the selection as to whether the cam 42 shall operate or not is made by a list-non-list lever 51 whose operation is described in the patent of Daly and Page, previously referred to. The handle of this lever is shown in Fig. 1 and is arranged so that when it is in the position marked "L" the printing mechanism will operate and when it is shifted to the position marked "A" the printing mechanism will not operate. An arm on shaft 60 connected to lever 51 operates a rod 52 (see Fig. 4) shifting it to the right in this figure when the machine is to print and to the left when the machine is not to print. The rod 52 (see also Fig. 2A) carries a nose piece 53 bevelled at its end to engage between extensions on two scissors members 54 and 55. The shifting of the rod 52 to the right serves to rock member 54 which is fixed to the shaft 57 carrying the latch 46, thus rocking the shaft counterclockwise (as viewed in Fig. 2) and the latch 46 out of engagement with the tail piece 47 on pawl 44. This permits the extension on pawl 44 to engage the notch in disk 41 to rotate the print shaft 35 with the main operating shaft.

The operation of the nose piece 53 in this case rocks the scissors member 55 slightly clockwise removing the aligning roller 58 from the notch 58a in the box cam 42. This aligning roller 58 serves to accurately set the printing shaft and its associated parts in zero position when no printing operations are occurring. The shifting of the list-non-list lever 51 also controls contacts 61 (see Fig. 4) whose function will be explained later.

The box cam 42 is provided with a groove 62 into which projects a roller 63 pivoted on an arm 64. The arm 64 is fixed to a rock shaft 65 which carries additional arms 66. As the box cam 42 rotates, the rock shaft 65 is rocked through the operation of arm 64 thereby raising the arms 66 in synchronism with machine operation. The arms 66 serve to raise and lower the type bars of the machine. The type bars are indicated at 71 and at their upper ends carry a type head 72 with type representing the several digits. These type bars are slidably mounted in a cross head 73 attached to the arms 66 through links 74 whereby the operation of the printing cam 42 serves to raise and lower the cross head. The cross head is provided with brackets 75, to which brackets are pivoted arms 76, each of which engages the under edge of a type bar 71. Springs 77 connected to the brackets 75 and arms 76 serve to normally raise the type bars with the cross head 73 thus bringing the several type in the type head 72 successively opposite the platen 78. The motion of any type bar may be interrupted without interfering with the motion of the cross head owing to the springs 77 which stretch to permit relative motion between the cross head and the type bar.

A type bar with proper controlling mechanism is provided for each column which the machine is capable of printing but as these are identical in operation and only differ from one another in construction by the position of their controlling magnets, which are staggered to conserve space, only one of them will be described.

Each type bar is provided with ratchet teeth 81 which cooperate with a pawl 82 to arrest the type bar in positions for selecting the several type for printing. The pawl 82 is normally latched by a latch 83 controlled from a call rod 84 operated by a printing magnet 85. The printing magnet is energized at different times to select printing of the different digits and when energized attracts armature 56 to pull the call rod 84 to the right thus releasing latch 83 and permitting pawl 82 through spring action to engage the ratchet tooth 81 which happens to be in proper position to be so engaged, thus arresting the type bar with the proper type opposite the platen for printing. When the cross head approaches the upper limit of its stroke, hammers 91, of which there is one for each type bar, are tripped to effect printing from the type which are opposite the platen. These hammers are operated by a common bail 92 whose structure is pivoted at 93 and urged in a counterclockwise direction against a stop 92b by a stout spring 94. A lever 95 is pivoted to the arm 66 and has a notch 95a in its end engaging an extension 92a on the bail structure. As the end of arm 66 rises to raise the crosshead, the end of lever 95 is forced to the left and retracts the bail 92 stretching spring 94. As the arm 66 approaches its upper limit an obstruction 95b encounters a pin 95c on the lever 95, rocking it about its pivot whereupon it releases the bail 92 to the action of the spring 94 causing it to deliver a sharp blow to the hammers 91 to effect printing.

Figure 3:
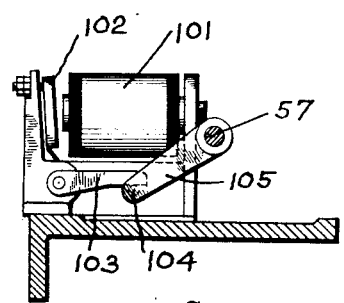
Fig. 3 is a detail of a control magnet for the printing mechanism.

The printing mechanism is called into operation for total printing when the machine is set for non-listing by a magnet 101 (see Figs. 3 and 4). This magnet is energized during totaling cycles in a manner to be explained later. When so energized it attracts its armature 102 whose pivoted supporting structure has an extending arm 103 which cooperates with a pin 104 on an arm 105 fixed to the shaft 57. The arm 105 thereupon rocks shaft 57, unless it is already in position to effect printing, and causes the latch 46 (see also Fig. 2) to release pawl 44.

The extension on the latter thereupon engages the slot in disk 41 causing the print shaft 35 to rotate with the main drive shaft 27 during the totaling operation. If the machine is set for non-listing the latch 46, as soon as magnet 101 is deenergized, moves back into position to engage the tail piece 47 of pawl 44 at the end of the total print cycle, thereby disengaging the clutch to permit non-listing of the following adding operations.

Figure 5:
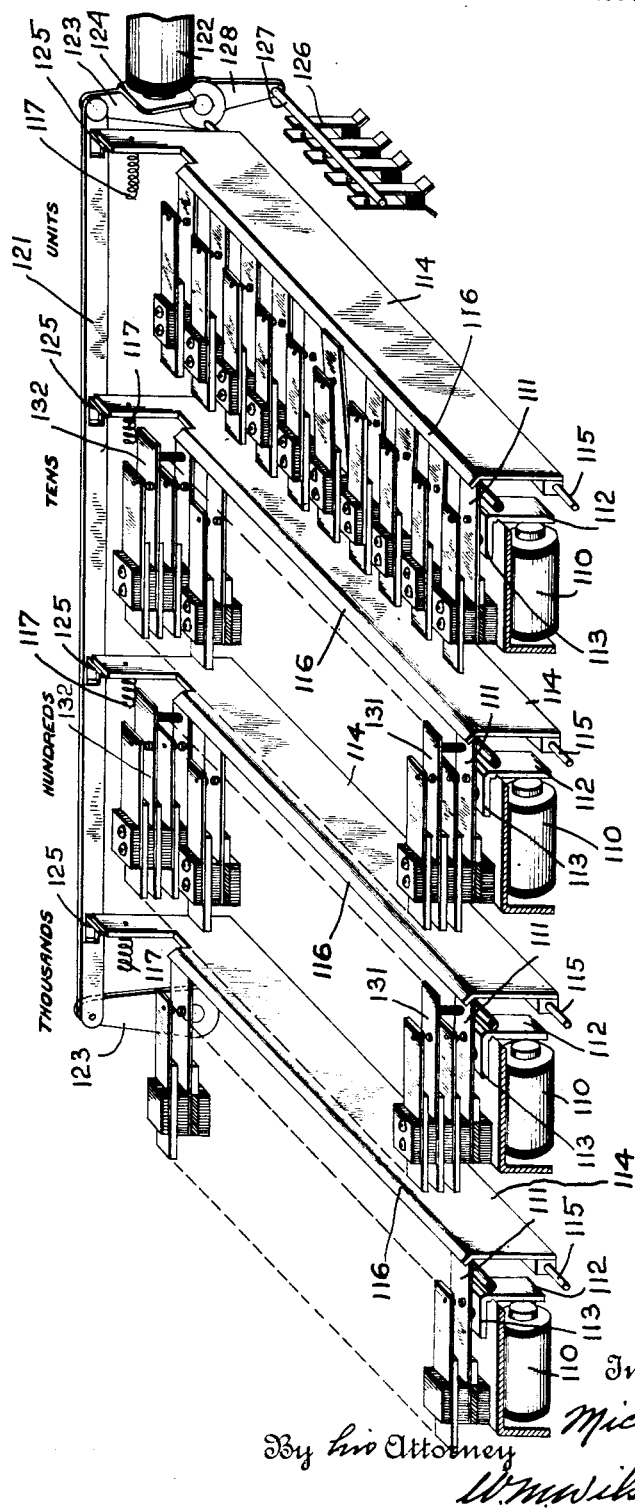
Fig. 5 is an isometric view of the electric accumulating mechanism.

A four denominational order accumulator according to the present invention is illustrated in Fig. 5. Each denominational order is provided with ten relays 110 each having an associated pair of contacts 111. Whenever any relay is energized, the rocking of its armature 112, which is suitably pivoted on a rod, forces the lower contact 111 upward by means of extension 113 and closes the contacts. A locking plate 114 pivoted at 115 has a turned-in edge as shown at 116 which lies in the path of movement of the lower contacts 111. The plate is normally held in position as shown, by a spring 117. When any set of contacts 111 close, the movement of the lower contact, owing to the turned-in edge 116, rocks the plate 114; and when the contact reaches circuit closing position, spring 117 returns the plate 114 to normal position locking the particular pair of contacts closed. The fifth contact is shown locked closed in this manner in the units order. Incidentally the rocking of the plate 114 to lock a contact in response to the energization of the corresponding magnet automatically releases any contact which was previously closed so that only one contact remains closed at the time.

The accumulators may be reset, that is, any contacts representing significant digits may be opened, by resetting bar 121 operated by a reset magnet 122. This bar is supported on pivoted arms 123 of which the right hand one carries the armature 124 of reset magnet 122. Opposite each locking plate 114 the bar is provided with a struck out tongue 125 cooperating with an upward extension of the locking plates 114. When the magnet 122 is energized, the bar 121 moves to the right and rocks all plates 114 to release any contacts 111 which are closed. It may be stated that in the operation of this accumulator it is necessary to start with the contacts 111 representing zero closed, as a basic circuit must be provided to start. For this purpose, contacts 126, of which one is provided for each denominational order of the accumulator are operated by a rod 127 carried on arm 128 fixed to and movable with the supporting structure of the reset magnet armature 124. Attraction of the armature closes the contacts 126 thereupon energizing the magnets 110 representing zero in each denominational order. Sufficient lost motion may be provided between the tongues 125 and the upward extensions of the bars 114 that the contacts 126 will be closed early enough in the operation to energize the zero magnets before plate 114 actually reaches locking position, so that the zero contacts 111 will remain closed after a resetting operation. In addition to the contacts 111 the intermediate orders of the accumulators are provided with an extra set of contacts 131 for the nine digit magnet and extra contacts 132 for the zero magnet. These contacts are arranged to close concurrently with the contacts 111 of the respective relays. They enter into the function of transferring as will be explained later.

Figure 10:
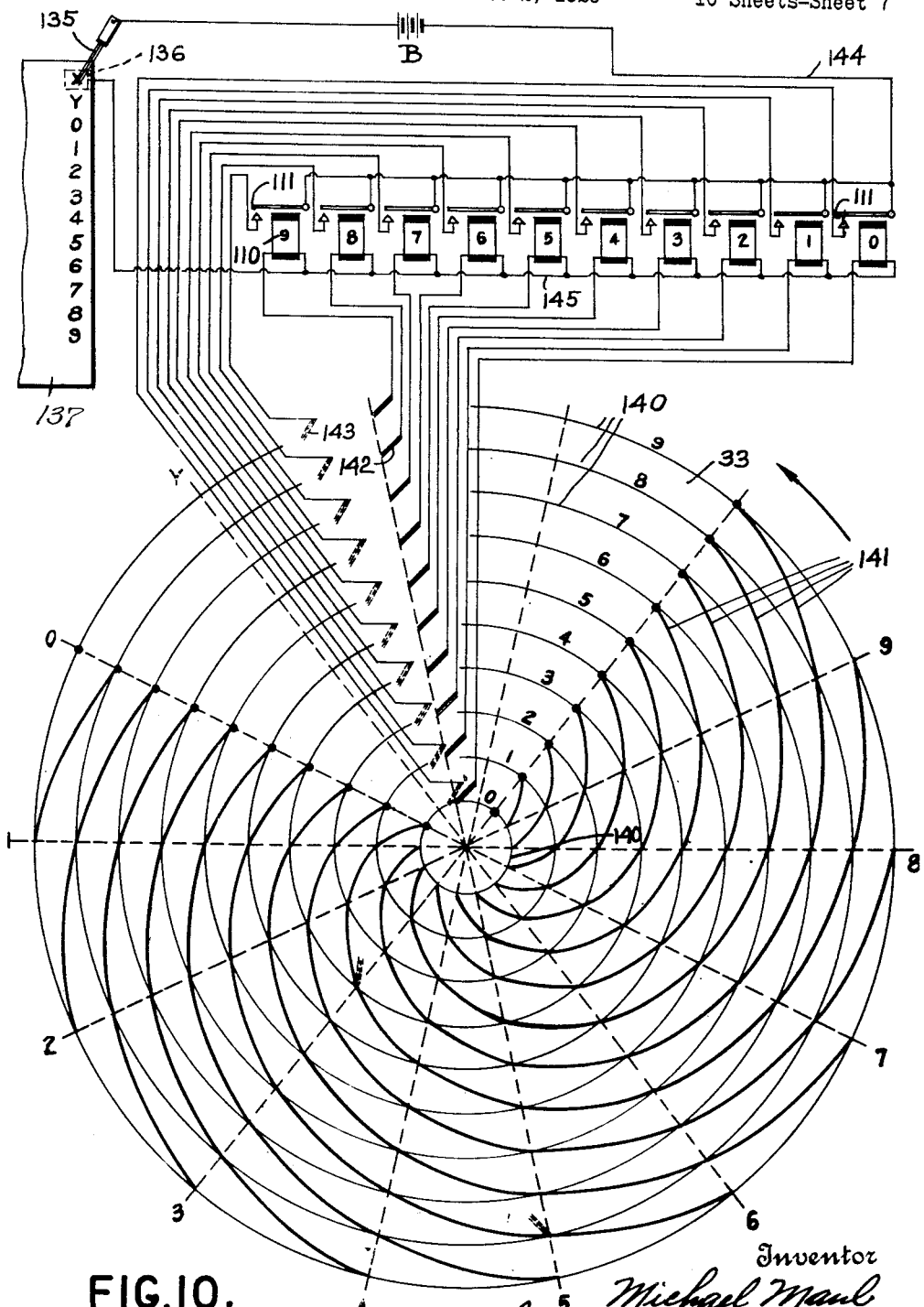
Fig. 10 is a diagrammatic view of a counter and commutator illustrating the manner in which addition is effected.

The principle of the adding operation for a single denominational order will be understood from Fig. 10. An analyzing brush of the tabulator is indicated at 135 cooperating with a contact block 136 in the usual manner. The tabulating card 137 is passed between the brush 135 and the block 136 and, as the card passes, a perforation in any index point position causes the brush 135 to engage the block 136 momentarily, this momentary contact being timed according to the location of the index point due to the steady motion of the card through the machine. The commutator 33 which, as previously explained, is mounted on the card feed shaft (see Fig. 1) rotates in synchronism with the movement of the card 137 so that given lines on the commutator indicated by dotted lines and marked from nine to zero pass a set of brushes as the corresponding index points pass the analyzing brush 135. On its underside the commutator 33 is provided with concentric conducting rings 140 and on its upper side the commutator is provided with spiral conductors 141. The rings 140 are discontinuous to open the adding circuits between cards when the analyzing brushes are in contact with roller 136. A row of brushes 143 cooperates with the rings 140 and a row of brushes 142 cooperates with the spiral conductors 141. Each spiral 141 is connected with one only of the rings 140 as indicated by the small circles. Each brush 142 is connected with one of the relay magnets 110, the outermost brush being connected to the No. 9 magnet, the next to the No. 8 magnet and so on. The brushes 143 are similarly connected to one of the contacts 111 of the relays 110, the outer brush being connected to the No. 9 relay contacts, the next to the No. 8 and so on.

A common return 144 for all the relay contacts 111 leads through a battery B, to the analyzing brush 135 and a common return 145 for all the relay coils leads to the contact roll 136. It will thus be seen that to energize any relay coil 110 the circuit must be completed at the analyzing brush 135 as well as between brushes 142 and 143. When the nine index point position of the card passes the anlyzing brush the dotted line marked "9" of the commutator 33 passes the brushes 142. At this time the No. 9 brush 142 encounters the spiral 141 which is connected with the zero ring 140, the No. 8 brush 142 contacts the spiral 141 connected to the No. 9 ring, No. 7 brush 142 cooperates with the spiral connected with the No. 8 ring, and so on. When the No. 8 index point on the card 137 passes the analyzing brush the dotted line designated "8" on the commutator 33 passes the brushes 142. The connections have now been shifted in that the No. 9 brush 142 now encounters the spiral 141 connected with the No. 1 ring 140, the No. 8 brush 142 cooperates with the spiral connected to the zero ring 141, and the No. 7 brush cooperates with the spiral connected to the No. 9 ring, and so on, from which it will be noticed that the circuit connections have been shifted to correspond with the shifting of the index points under the analyzing brushes. This shifting of one unit for each index point position continues as the commutator rotates and the card feeds past the anlyzing brushes.

The adding operation may be understood from a specific example. Assume first that the zero magnet 110 has been energized to close its contacts 111, and assume that a card passing the analyzing brushes has a perforation in the No. 3 index point position. The card feeds beneath the analyzing brushes with the nine index point leading and when the three index point reaches the brushes, causing temporary contact between the brush 135 and the block 136, the dotted line No. 3 of commutator 33 is under the brushes 142. An adding circuit is thus established as follows: from the brush 135, through battery B, common return 144, zero contact 111 to zero brush 143 thence through zero ring 140 to spiral 141 connected to the zero ring 140. In the three position of the commutator 33 the spiral connected to the zero ring 140 is cooperating with No. 3 brush 142 so that the circuit is continued through this brush to No. 3 relay magnet 110 and through common return 145 to the block 136. Relay magnet No. 3 is thus energized, representing the entry of a three into the accumulator due to the presence of a three index point on the card 137. Now assume that the next card has a perforation in the five index point position, meaning that the accumulator at the end of the operation should show eight or in other words, that the contacts 111 of the No. 8 relay 110 should be closed. As the five index point position is passing the analyzing brush 135, the dotted line No. 5 of commutator 33 is passing the brushes 142. In this case the adding circuit extends from analyzing brush 135, through battery B and common return 144, through contacts 111 of the No.3 relay which are the only ones closed at this time, thence to No. 3 brush 143 and No. 3 ring 140, to the spiral 141 connected to the No. 3 ring.

It will be noted that when the commutator reaches the position in which the No. 5 dotted line is under the brushes 142 this particular spiral will be in contact with the No. 8 brush 142. Hence the circuit is extended through the No. 8 relay 110, closing its contacts 111, and back to the roller 136. Other digits may be added in the same manner, the commutator 33 through its brushes 142 and 143 cooperating with the card to effect the proper addition in each case.

The subtracting operation utilizes the same mechanism but the circuit connections are changed. This operation may be understood from Fig. 11. The circuit arrangements have been changed so that the brushes 142 are connected to the contacts 111 instead of to the relay coils as in the adding operation and the brushes 143 have been connected to the relay coils 110 instead of to the contacts 111 as formerly. The arrangement otherwise remains the same, that is, the No. 9 brush 142 is connected to the No. 9 contacts 111 and the No. 9 brush 143 is connected to the No. 9 relay coil and so on. The commutator 33 operates in synchronism with the feed of the card 137 as before but owing to the changed circuit connections a digit represented by an index point on the card 137 will be subtracted from the reading of the accumulator instead of added to it. This will be clear from a specific example. Assume that contacts 111 of the No. 8 relay 110 are closed indicating that the accumulator has received an entry of eight either from a single card or by successive additions. Now assume that a card 137 provided with an index point in the No. 3 position passes the analyzing brush 135.

In this case three is to be subtracted from eight meaning that at the end of the operation the No. 5 relay contacts 111 should be closed. As the three index point is passing the analyzing brush 135 the dotted line No. 3 of commutator 33 is under the brushes 142. The subtracting circuit therefore extends as follows: from the analyzing brush 135, through battery B, common return 144, closed contact 111 of relay No. 8, thence to No. 8 brush 142. At this time the No. 8 brush 142 engages the spiral 141 connected to No. 5 ring 140. Hence the circuit is continued through No. 5 brush 143 to No. 5 relay coil 110, closing its contacts 111, and to the common return 145 to the block 136. Other digits represented by index points are subtracted in an entirely similar manner, the rotation of the commutator 33 always effecting the proper bridging between the brushes 142 and 143 to effect the proper subtraction due to the arrangement of the spiral contacts 141.

Figure 6:
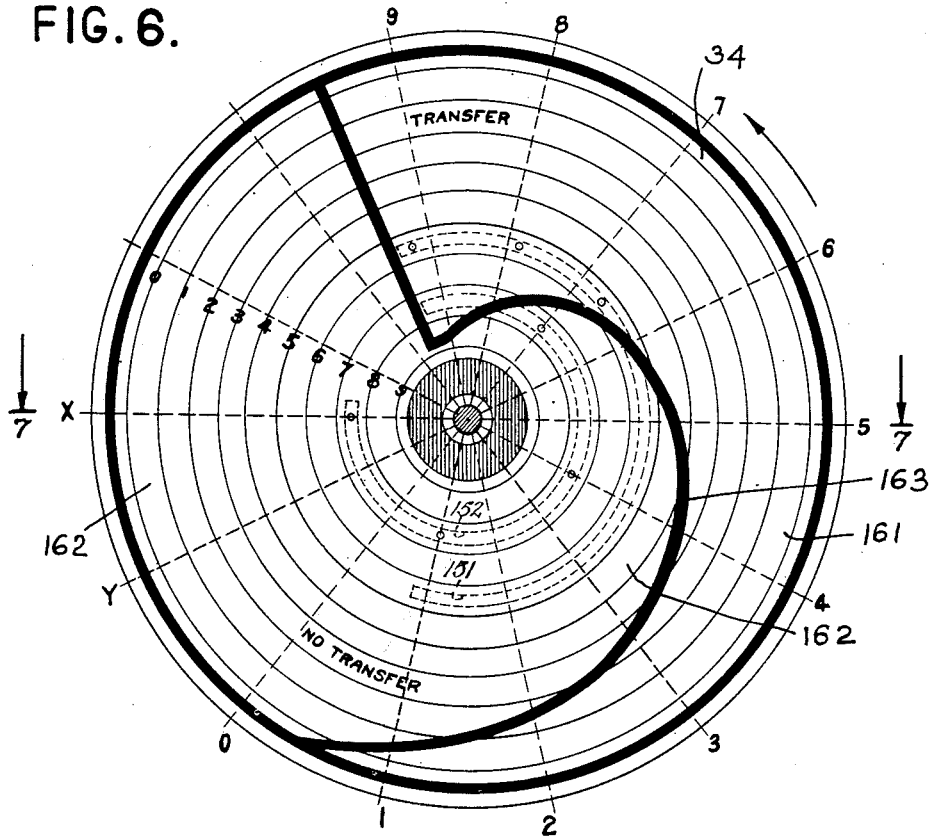
Fig. 6 is a plan view of a commutator for effecting transfers during adding operations.
Figure 7:
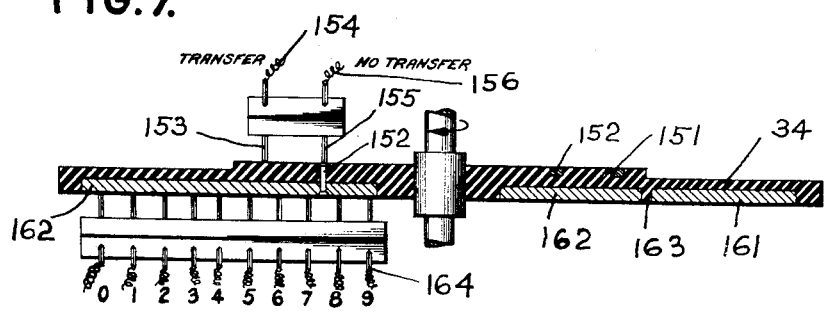
Fig. 7 is a section on line 7—7 of Fig. 6.

Before explaining the complete operation of the machine according to the circuit diagram, certain fundamental principles of the transfer mechanism will be explained in connection with Figs. 6 and 7 which illustrate the construction of the adding transfer commutator 34 which is also mounted on the card feed shaft 28 as shown in Fig. 1. As in all accumulators, whenever a reading which results from an entry on a certain denominational order is less than the reading which stood in that order before the entry, a transfer must be effected. For example, if the reading in a denominational order is "5" before an entry, no transfer is required if the entry results in a reading of 6, 7, 8 or 9 all of which are higher in value than five, but if the entry results in a reading such as 4, 3, 2, 1 or 0 which are lower than the preceding entry, it means that the adding operation has in effect, passed through zero and one unit must be transferred to the next denominational order. According to the present invention two separate return circuits are provided for the adding relays, one circuit being utilized if a transfer is to be effected and the other being utilized if no transfer is to be effected. The operating impulse for the entry through the return circuit effects a set up through which the necessary units may be transferred after the adding portion of the cycle. The selection of the transfer or non transfer return circuit is accomplished through the commutator 34 which operates somewhat similarly to the commutator 33 but is simpler in construction. On one side, this commutator is provided with two concentric segmental conductors 151 and 152 of which 151 cooperates with a brush 153 connected to the transfer return circuit 154 and the segment 152 cooperates with a brush 155 connected to the no transfer return circuit 156.

As will be clearly explained later these circuits are not the actual transfer circuits but the return circuits for the adding relays through which the adding impulse is effective to set up the transfer mechanism or not to set it up as required by the adding conditions. The other side of the commutator 34 is provided with two plates 161 and 162 which are insulated from each other as indicated at 163. A portion of this insulation 163 is of spiral form to obtain a shifting of the circuits. Plate 161 is electrically connected to segmental conductor 151 and plate 162 is connected to segmental conductor 152 by means of metallic pins extending through the commutator. A set of brushes 164 which are connected in circuit with the adding relays cooperates with the plates 162 and 163. The commutator 34 rotates in synchronism with the card feed and the spiral strip of insulation 163 serves to shift the return circuits 154, 156 according to whether a transfer is required or is not required. Suppose a five is indicated by an accumulator. If 0, 1, 2, 3 or 4 is added to the next operation, no transfer is required. In any of these cases brushes 164 No. 5, 6, 7, 8 and 9 through which the adding circuits are completed will all be cooperating with the plate 162 connected to segment 152 during the entry. Consequently the return would be through the no transfer circuit 156. If either 5, 6, 7, 8 or 9 is added to the five, a transfer will be required. In this case the 0, 1, 2, 3 or 4 brushes 164 will be in the adding circuit and it will be noted that for index points 5, 6, 7, 8 and 9 all these brushes are cooperating with the transfer plate 161 whereby the transfer circuit 154 is introduced into the adding circuit. The spiral insulating strip 163 thereby determines for an entry from each particular index point whether transfer is to occur or is not to occur according to whether the resulting reading is less or greater than the previous reading on the transfer.

The mechanical structure and operation of the transfer commutator has been explained at this point to assist in an understanding of the circuit diagram, but its actual operation will be clearer from the following explanation of the machine in accordance with the circuit diagram.

Figure 8:
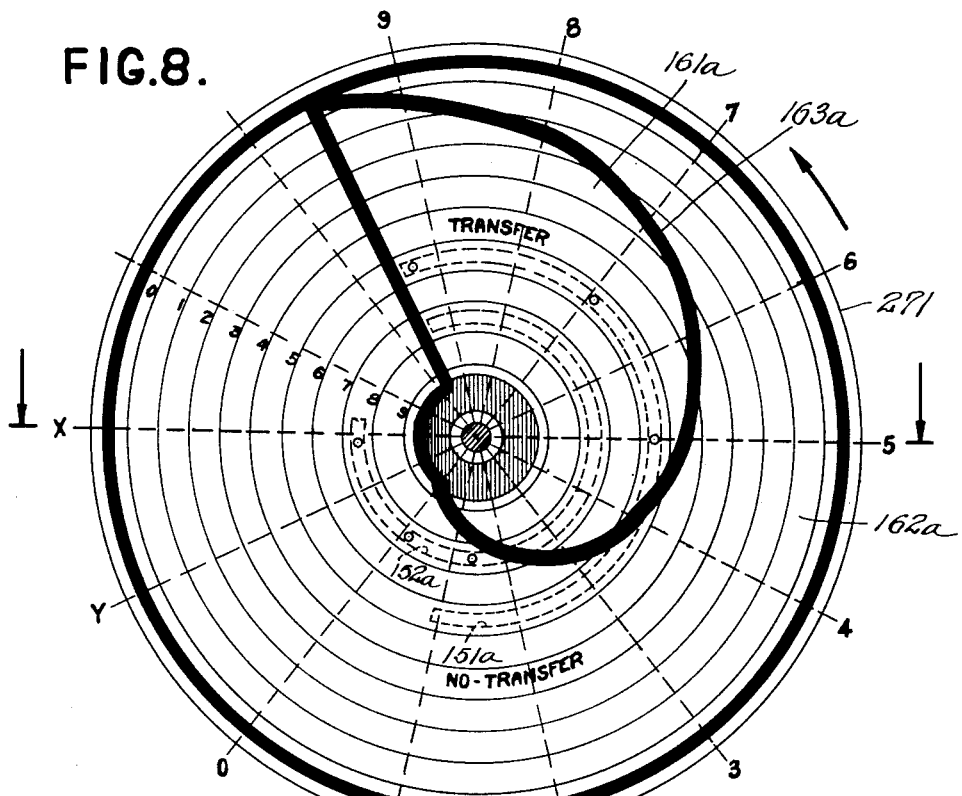
Figs. 8 and 9 are plan and sectional views respectively of a commutator for effecting transfers during subtracting operations.
Figure 9:
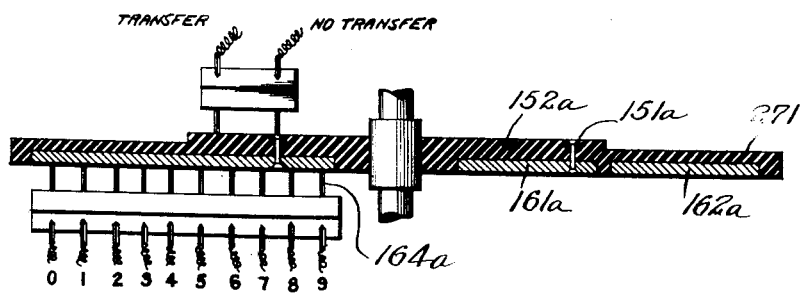

A transfer commutator 271 for subtraction is shown in Figs. 8 and 9. The arrangement is substantially similar to that of the adding transfer commutator but the spiral strip of insulation has been arranged to shift the return circuits properly to take care of transfers which are necessary during subtraction. The parts in Figs. 8 and 9 corresponding to similar parts in Figs. 6 and 7 are identified by the same reference numerals with the subscript $a$. The theory and operation will be obvious from the prior description of the adding transfer commutator.

The circuit diagram has been simplified as much as possible by applying it to a simple type of machine having a single row of analyzing brushes beneath which the cards feed as they leave the magazine. Under these conditions each card group, that is each different classification of cards, should be placed in the magazine or hopper separately, but it is well understood that the same principles of operation could be applied equally well to a machine provided with automatic control as described in the patent to Daly and Page, No. 1,762,145. The motor 25 which drives the operating mechanisms of the machine is supplied with power from a pair of main lines 171, 172. This is a shunt motor having a resistance 173 in its field circuit which may be shunted to give low speed, high torque characteristics to the motor when the machine is driving the printing mechanism, or in other words, operating under a heavy load. During straight tabulating or adding operations when the printing mechanism is not being driven the shunt around resistance 173 is removed so that the motor will operate at high speed.

The motor may be started into operation by depressing the start key ST whereupon a preliminary circuit is established from main line 171, through lead 174, motor armature 25, thence through card feed clutch magnet 176, motor holding relay 177, start key ST, stop key S to the other main line 172. Energization of the relay 177 closes its contacts 181 providing a circuit for the motor and card feed clutch extending through card feed contacts CF—1, which close shortly after the card feed starts in operation, thereby shunting the start key ST. This permits the start key to be released shortly after the card feed starts. As soon as cards reach the brushes, card lever contacts 182 are closed in the well known manner so that the motor will be maintained in operation as long as cards continue to feed past the brushes. When the card lever contacts 182 open, the motor circuits maintained until the end of the cycle through a pair of contacts CF—2 which stop the motor at the end of the cycle, the opening of these contacts being so timed that the motor and the other mechanisms stop in normal home position.

At the end of a card group a total may be taken either automatically or through manual initiation. If an automatic total is desired, a manually operated switch 183 is closed. This switch controls magnet 101 which, as previously explained, effects operation of the printing clutch to cause the printing shaft to rotate during totaling. The circuit of the magnet 101 and switch 183 includes card feed contacts CF—4, which close toward the end of each card feed cycle, and card feed clutch contacts 186 which are open as long as the card feed clutch is engaged and closed when it is disengaged.

As soon as the card feed clutch disengages, then, indicating that card feed has ceased, a circuit is established from line 171, through wire 174 to motor 25, thence to magnet 101, cam contacts CF—4, switch 183, relay 187, card feed clutch contacts 186, to the other main line 172. The card feed contacts CF—4 only remain closed for an instant but as soon as magnet 101 is energized it closes contacts 188 forming a shunt about the card feed contacts CF—4 and switch 183. Shortly after the total print cycle starts, cam contacts P—1 close, short circuiting and de-energizing printing cam clutch magnet 101 but maintaining the motor circuit until the end of the printing cycle when they open and stop the motor operation. Toward the end of the total print operation cam contacts P—2 close energizing the reset magnet 122 which serves to remove the reading from the accumulator relays and close the zero contacts in each denominational order to prepare for future adding operations. The circuit of the reset magnet 122 includes card feed clutch contacts 191 which are closed only when the card feed clutch is disengaged thus preventing energization of the reset magnet as long as cards are feeding.

Ordinarily the resistance 173 is in series with the shunt field of the motor so that the normal speed of the motor is high. When the list-non-list lever 51 (see Figs. 4 and 1) is shifted to listing position contacts 61 and 62 are closed. Contacts 61 shunt the resistance 173 to provide low motor speed when the printing mechanism is operating during listing. A relay 187 in the total print circuit on being energized closes its contacts 192 to short circuit the resistance 173 during total printing. Hence any printing operation is performed at low speed while any straight tabulating or adding operation is performed at high speed.

The total key T is provided to permit of manually controlled totaling at any time when the card feed is not operating and a resetting key R provided for resetting under manual control whenever desired. If the manual key R is to be used, an automatic reset switch 193 should be opened to prevent automatic reset.

After the card feed clutch magnet 176 is energized the cards 137 feed one by one beneath the analyzing brushes 135 and accomplish the adding operations as previously explained in theory in connection with Fig. 10. The adding circuit will now be traced in detail to explain the concurrent entry of digits in the several denominational orders and the necessary transferring operations. Each analyzing brush 135 is connected through star cams 195, which close the circuit for an instant at each index point position, to the contacts 111 of the separate denominational orders. In the circuit diagram an accumulator of only three denominational orders is shown as the operation of the machine may be fully understood from an accumulator of this size. The analyzing brush 135 associated with the hundreds column on the card is connected through its star cam 195 and wire 196 to a lead 197 common to all the contacts 111 of the adding relays of the hundreds denominational order. In like manner the tens brush 135 is connected through lead 198 and common lead 200 to the contacts 111 of the tens denominational order counting relays, and the units brush 135 is similarly connected to the contacts 111 of the units order relays. The other contact 111 of each pair in the case of the hundreds order is connected through separate wires, cabled as indicated at 201, to the upper contacts of pairs 204 of a shifting mechanism controlled by a magnet 203.

For adding operations the magnet 203 is de-energized and the middle contacts 202 cooperate with upper contacts of pairs 204. The middle contacts 202 are connected individually through wires 205 to brushes 143 of the adding commutator 33. The brushes 142 of this commutator are individually connected through wires 210 to middle contacts 212 cooperating with pairs 211. The middle contacts 212 are likewise shiftable by the shifting magnet 203 and are normally in engagement with the upper contact of each pair 211. The upper contacts 211 are individually connected to corresponding relay magnets 110 and a common return 213 continues the circuit to a battery B which in turn is connected to a block cooperating with the hundreds brush 135. The connection of the tens and units denominational order adding device is entirely similar to that just described for the hundreds order and the description need not be repeated. It will be recalled that at the beginning of an adding operation the zero contact 111 is closed and that the adding circuit is established through this closed contact and the appropriate magnet 110 is selected by the analyzing brush 135 operating in conjunction with the commutator 33. The adding circuit for the hundreds denominational order will be clear from the previous explanation of the circuits.

The circuits for the tens and units accumulators are complicated by the fact that the return circuits for the counter relays in these orders serve to set up the transfer circuits. The adding circuit for the tens counter element extends as follows: from battery B to tens analyzing brush 135 and its star cam 195, through wire 198 and common lead 200 to contacts 111, thence through cable connections 221 to the upper contacts of pairs 223 of the shifting mechanism, thence through shiftable contacts 222 and wires 205 to brushes 143 of the commutator 33, thence through the commutator to brushes 142 and through wires 210 to shiftable contacts 226 normally in engagement with upper contacts of pairs 225 and thence to relay coils 110 of the tens order. Instead of utilizing a common return, the magnets of this order are individually connected through cable 226a to individual brushes 164 cooperating with the adding transfer commutator 34 and thence either through line 154 or 156 depending on whether a transfer is to be effected or is not to be effected. The lines 154, 156 will be selected by the transfer commutator 34 according to whether the particular entry being handled requires a transfer operation or does not require one as previously explained in connection with Figs. 6 and 7.

Assuming a particular entry is to effect a transfer, the circuit will be continued through wire 154 and a magnet 230 which is the transfer magnet, thence through cam contacts CF—10 and wire 231 to the other side of battery B of the tens order. If no transfer is to occur the circuit from the adding transfer commutator 34 extends through line 156 and magnet 232, which is the non transfer magnet, thence through wire 231 back to the battery as before. It will therefore be noted that if a transfer operation is to occur, magnet 230 is energized through the return circuits of the adding relay and if a transfer is not to occur, the magnet 232 is energized through these circuits.

The adding operation for the units order is substantially the same, the magnet 234 being energized when a transfer is to occur and a magnet 235 being energized when a transfer is not to occur. The energization of magnet 230 or 232 shifts a contact lever 236 and this lever is impositively held in either shifted position by a spring 235a. If the transfer magnet 230 is energized this lever closes contacts 237 thereby preparing the actual transfer circuit.

The actual transfer occurs (see Fig. 10) when the analyzing brush 135 is passing the X position on the card 137 this being beyond the adding portion of the machine cycle. At this time the card feed contacts CF—7 close energizing a magnet 240 (see Fig. 12.) This magnet shifts a group of contacts 240a for each denominational order, except the units order, connecting the wire associated with each counting relay 110 to the next lower contact 111 of the same order. That is, the wire connected with the No. 9 relay is bridged to the wire connected with the No. 8 contacts 111. The complete arrangement will be clear from the index numerals placed on these wires in the drawings. Incidentally these shifting or circuit closing mechanisms including magnets 240 open the wires 205 and 210. This construction has been indicated in connection with the dotted line representations of magnet 240 by a dotted line extending from the armature of this magnet to the several contacts which it operates. Substantially at the same time the cam contacts CF—8 (see Fig. 12a) close to complete the transfer circuit. The transfer circuit for the hundreds order extends from battery B of the hundreds order, through wire 241, to lever 236, thence through contacts 237 (closed when a transfer to the hundreds order is to be effected) and card feed contacts CF—8 to wire 196, to wire 197, to the closed contact 111 of the hundreds order, thence through cable 201, contacts 204—202 and appropriate wire 1205 through the contacts 240a controlled by the magnet 240, through appropriate wire 1305 contacts 211 and 212 and cable 215 to the relay coils 110 of the hundreds order and thence through wire 213 back to battery B.

Owing to the connection of each wire from contacts 111 to the next higher wire leading to the counter relay coils it will be obvious that the hundreds reading will be changed to indicate the addition of one unit. The straight transferring operation from the units to the tens order is effected in the same manner.

A transfer to and from the tens unit is complicated by the fact that this order may have to transfer on a transfer. That is, if its reading is nine prior to a transferring operation and it receives a unit from transfer, its reading changes to zero and it must transfer one unit to the hundreds order. This is taken care of for addition by contacts 131 associated with the No. 9 contacts 111, the contacts 131 being closed whenever the No. 9 contacts 111 are closed to indicate a reading of nine on the counter. Contacts 131 are connected through wires 251 and 252 to a pair of contacts 253 operated by the lever 254 of the units order which latter contacts are closed when the transfer magnet 234 of this order has been energized to indicate a transfer. The contacts 253 are connected directly to the main line 172 thereby providing a circuit from line 172 to contacts 131. This circuit is continued through wire 256, upper contact 257, middle contact 258, associated with the shifting mechanism, thence through wire 259 to the left hand contacts CF—10. The middle contact of this group CF—10 is connected to the transfer magnet 230 of the tens order. Normally the right hand contacts CF—10 are closed to permit energization of the transfer magnet 230 on straight transferring operations as previously explained.

When the Y position of the card (see Fig. 10) is passing the analyzing brushes or in other words, just prior to the actual transfer operation, contacts CF—10 shift thereby continuing the circuit from contacts 131, through left hand contacts CF—10, to the transfer magnet 230, thence through wire 154, back to the line 171. Thus if the tens accumulator indicates nine meaning that its contacts 131 are closed and if at the same time the units order is to transfer as evidenced by closing of the contacts 253, the transfer magnet 230 of the tens order will be energized to shift the lever 236 whereby a normal transferring operation is effected from the tens to the hundreds order.

The subtracting operation is essentially similar to the adding operation although as previously explained in connection with Fig. 11, the circuits are re-arranged so that an index point on a record card will result in subtraction instead of addition. The shifting of the circuits necessary for subtraction is effected by a magnet 203 for the hundreds order, a magnet 261 for the tens order and a magnet 262 for the units order. The magnet 203 when energized disconnects the middle contacts 202, 212 from the upper contacts 204, 211 respectively, and connects them with the lower contacts of their respective pairs. It will be noted that this shift connects the brushes 142 of commutator 33 to the contacts 111 instead of to the magnets 110 as in addition and connects the brushes 143 to the magnets 110 instead of to the contacts 111 as in addition. From the prior description of Fig. 11 the subtracting operation will be clearly understood.

It is proposed that each card 137 which carries a negative item or an item to be subtracted will be provided with a perforation in advance of the first adding perforation in a column cooperating with an analyzing brush 260. Sufficient space is left on the lower edge of the card below the adding fields to permit the punching of such a perforation. Any card bearing such a perforation closes a circuit from line 171 through wire 174, armature of motor 25 and line 262, analyzing brush 260 thence through wire 265 to card feed contacts CF—15 which close concurrently with the passage of the portion of the card bearing the special perforation beneath the brush 260, thence through wire 266, to magnet 203 and to the other main line 171. The magnet 203 on being energized, attracts its armature and shifts the contacts 202, 212 to prepare for subtracting operations in connection with the card in question. The magnet 203 is energized momentarily but its armature 267 is latched down by a spring operated latch 268 and remains latched until released by cam 269 operated by the card feed and which releases the latch 268 after the card cycle is complete. The magnets 261 and 262 are operated simultaneously with the magnet 203 to shift the shifting mechanism in connection with the tens and units orders.

The transfer operation for subtraction is substantially similar to that for addition but in subtraction the transfer takes the form of borrowing one from a higher order whenever the answer in any order is greater than the reading which stood in that order before the subtracting operation.

Thus if at the beginning of the subtraction the tens denominational order registered five, and if after subtraction the tens order read six, obviously one unit must be borrowed from the hundreds order, this being in the nature of a negative transfer.

The subtracting transfer commutator 271 is substituted for the adding transfer commutator 36 by the operation of the shifting mechanism controlled by the magnet 263. This subtracting transfer commutator is similar to commutator 36 but its conducting plates are arranged to provide for the proper negative transfers. The operation of the transfer mechanisms is entirely similar to that for addition but as the circuits have now been shifted for subtraction instead of addition, obviously the transferred unit in each case will be subtracted and not added, or in other words, it constitutes a borrowing operation instead of a true transferring operation.

In the case of the tens order this negative transferring operation may in itself result in another transferring operation because if the tens order registers zero and one is borrowed during subtraction, this order in turn must borrow one from the hundreds order. The operation here is substantially the same as in straight transfer although in this case contacts 132, which are closed whenever zero relay contacts 111 are closed are substituted for the contacts 131 in the circuit leading to the transfer magnet 234. This substitution of contacts 132 for contacts 131 is effected by contacts 257—258 under control of the magnet 261 which is energized to operate the shifting mechanism for the tens order during a subtraction operation. As before, a transfer operation between the units and the tens order serves to set up the tens transfer relay 230 thereby effecting a transferring operation between the tens and hundreds order. This will be clear from the previous description of a like operation in transfer for addition.

During listing operations the printing magnets 85 (Fig. 12) are energized directly from the analyzing brushes 135, these circuits being maintained open, however, during straight addition (without listing) owing to the commutator 38 which rotates only when the printing mechanism operates and at other times opens the circuits connecting the printing magnets 85 to the analyzing brushes. When this commutator 38 is rotating brushes 291 are bridged by the conducting section of the commutator and when an index point encounters an analyzing brush 135 a circuit is completed from the analyzing brush to star cam contacts 195, line 196 in the case of the hundreds order, to printing magnet 85 and through brushes 291 to battery B and back to the analyzing brush. This provides for energizing the printing magnets 85 at differential times to effect selection of the proper printing type for printing in the manner previously explained in connection with the description of the mechanical details of the printer.

Total taking also results in operation of the printing mechanism whereupon the commutator 38 operates to complete the printing magnet circuit 85 through the battery B to the totaling circuits. Each denominational order is provided with a total taking commutator 37. This commutator is stationary and is provided with ten conducting segments designated from zero to nine which are connected to the corresponding contacts 111 of the associated accumulator. During total taking operations a brush 292 rotates, sweeping the commutator segments in succession in the order and with timing equivalent to that of the passage of a card past the analyzing brushes.

At the beginning of total taking one of the contacts 111 will be closed indicating the reading in the denominational order. The total taking operation is identical for all denominational orders and it will be explained in connection with the hundreds order as the circuits for this order on the drawings are shorter than those of the tens and units orders. As the brush 292 in the hundreds order encounters the segment corresponding to this closed contact 111 a circuit will be established through the printing magnet 85 extending as follows: from battery B, through wire 295, card feed clutch contacts 296 which are closed only when the card feed clutch is disengaged, thus preventing operation of any of the totaling circuit during adding, through wire 297 to brush 292, thence through the particular segment of the commutator to the closed contact 111 and through the common return 197 and wires 196 and 300, to hundreds order printing magnet 85, thence through brushes 291 to the other side of battery B. This effects total printing of the amount standing on the accumulator in the hundreds order and printing in the other orders is effected in a similar manner. Directly after the total printing operation the reset mechanism operates as previously explained to wipe out the reading on the accumulator and close the zero contacts 111 in each denominational order for the next adding operation.

The invention has now been described in connection with one operative embodiment whose form has been simplified as much as possible but it will be understood that the same principles of operation may be applied to other types of machines without the exercise of invention.

I claim:—

1. In an accounting machine, a multi-denominational accumulating mechanism comprising a series of relays one for each digit in an order and associated contacts controlled thereby, a group of digit circuits extending through said relays and contacts and means for shifting the circuit connections to permit a circuit to be closed from any closed contact through any relay selectively to effect algebraic addition, entering mechanism and means for coordinating said entering mechanism and said accumulating mechanism to permit concurrent entries on several denominational orders.

2. In an accounting machine, an accumulating mechanism comprising a relay coil for each digit and a pair of contacts controlled thereby, an entering circuit connected to each pair of contacts and having individual branches extending through all relay coils and means for selecting the individual branches through the relay coils successively to effect accumulative entries according to the time of operation of the entering circuit.

3. In an accounting machine, an accumulating mechanism comprising a relay coil for each digit and a pair of contacts controlled thereby, an entering circuit connected to each pair of contacts and having individual branches extending through all relay coils and a commutator mechanism for selecting the individual branches through the relay coils successively and in progressive order to effect accumulative entries according to the time of operation of the entering circuit.

4. In a tabulating machine, a group of circuits, one circuit corresponding to each of the several digits, record analyzing mechanism and shiftable contact mechanism for connecting the digit circuits successively to the analyzing mechanism in serial order for energizing the same to effect entry of different digits and means operated by the circuits for representing the different digits.

5. In a tabulating machine, a group of circuits corresponding to the several digits, a record analyzing brush for successively searching index point positions representative of the digits on records and circuit shifting mechanism for connecting a different circuit to the analyzing brush for each index point position on the records.

6. In a tabulating machine, a group of circuits corresponding to the several digits and relay devices in each circuit, a record analyzing brush for successively searching index point positions representative of the digits on records, circuit shifting mechanism for connecting the circuits in progressive succession to the analyzing brush according to the successive searching of the index points and means controlled by the relay devices for determining the basic circuit for each entering operation.

7. A tabulating machine, comprising means for automatically feeding successive records bearing digit designations through the machine, record controlled entering mechanism, a multi-denominational accumulating mechanism comprising a plurality of groups of electric circuits of which one circuit of each group may be closed to represent a digit, means for coordinating the entering mechanism and the accumulating mechanism to permit simultaneous entry of digits of a multi-denominational number on the several groups of circuits and transfer mechanism for modifying the circuit energizations to permit the accumulation of true results in multi-denominational amounts.

8. A tabulating machine comprising record controlled entering mechanism, a multi-denominational accumulating mechanism comprising a plurality of groups of circuits each group containing a circuit for each digit and a relay in each circuit, a pair of return circuits for the several relays and transfer mechanism comprising a switching device for selecting one return circuit when a transfer operation is to occur and the other return circuit when a transfer operation is not to occur.

9. A tabulating machine comprising record analyzing mechanism, accumulating mechanism including groups of relays, one for each digit, means controlled by the analyzing mechanism for energizing one relay of each group to register a multi-denominational number, a pair of return circuits for each relay and means controlled conjointly by the analyzing mechanism and the relays to select one of the return circuits when a transfer operation is to occur and the other return circuit when a transfer operation is not to occur.

10. A tabulating machine comprising record analyzing mechanism for analyzing the index point positions of records successively, accumulating mechanism including a group of relays, one for each digit for each denominational order, means controlled by the analyzing mechanism for energizing one relay of each denominational order to register a multi-denominational number, a pair of return circuits for the relays and a commutator operating in synchronism with the successive analysis of index point positions for selecting the relay return circuits according to whether each entry is to result in a transfer operation.

11. A tabulating machine comprising record analyzing means for concurrently searching a plurality of record columns for index points and the several index point positions of each column successively, electrical accumulating mechanism having, in each denominational order, a plurality of circuits, each circuit representative of a different digit, and means cooperating with the record analyzing means for controlling the circuits in the different denominational orders to effect entry of multidenominational amounts in the electrical accumulating mechanism according to the records analyzed by the analyzing means.

12. A tabulating machine comprising record analyzing means for concurrently searching a plurality of record columns and the several character representing index point positions of each column successively, electrical entry receiving devices having a plurality of circuits for each record column, each circuit representative of a different character which may be represented by the index points in a column, and means cooperating with the record analyzing means for controlling the circuits to effect selective energization of the same to manifest characters corresponding to the index points on records analyzed by the analyzing means.

13. A record controlled accounting machine comprising an analyzing mechanism consisting of a single circuit controlling device for each record column operated at different times in response to index points representing the different digits in a record column, accumulating mechanism having a group of circuits, one corresponding to each digit, for each denominational order, a circuit shifting device for automatically connecting each circuit of the group to the single circuit controlling device in succession and in the order in which the circuit closing device is operated in response to index points representing the different digits, and means controlled by the circuits according to their energizations to coordinate different circuits with the several index point positions in a record column.

14. An accounting machine comprising data entering means consisting of circuit closing mechanism, entry receiving means including a separate circuit for each character which may be entered by the data entering means and a commutator device with continuous spiral conductors on its surface for successively connecting the circuits to the circuit closing mechanism.

15. A tabulating machine for adding and subtracting comprising record controlled entering mechanism, electrical accumulating mechanism having circuits in each denominational order representative of the different digits, means controlled by the entering mechanism for concurrently entering a plurality of digits of different denominational orders from controlling records into said electric accumulating mechanism and record controlled means for automatically selectively effecting addition or subtraction of the entered digits.

16. A tabulating machine for adding and subtracting comprising record controlled entering mechanism, electrical accumulating mechanism having circuits in each denominational order representative of the different digits, means controlled by the entering mechanism for concurrently entering a plurality of digits of different denominational orders from controlling records into said accumulating mechanism, record controlled means for automatically selectively effecting addition or subtraction of the entered digits, separate transfer mechanisms associated with the accumulating mechanism for addition and subtraction and record controlled means for selectively calling said transfer mechanisms into operation according to whether addition or subtraction is to occur.

17. An accounting machine comprising electrical accumulating mechanism including, in each denominational order, a plurality of circuits, one for each digit, a group of entering circuits, one for each digit, common to all denominational orders and a separate entering device for each denominational order to selectively connect the digit circuits of the several denominational orders of the accumulating mechanism to the common entering circuits to effect digit entries into the several denominational orders of the accumulating mechanism.

18. A tabulating machine comprising means for automatically feeding successive controlling records bearing data designations through the machine, entering mechanism controlled by the records and including means for analyzing the records for their data designations while they are in continuous motion through the machine, electrical accumulating mechanism comprising a circuit network with circuit shifting devices to variously interconnect the circuits thereof according to the data represented by the accumulating mechanism and means controlled by the entering mechanism for automatically, by machine operation, concurrently entering a plurality of digits of different denominational orders from the controlling records into said electrical accumulating mechanism.

19. A tabulating machine comprising means for automatically feeding successive controlling records bearing index points representing numbers through the machine, analyzing means for concurrently searching a plurality of record columns for index points while the records are in continuous motion through the machine, electrical accumulating mechanism comprising a circuit network with circuit shifting devices to variously interconnect the circuits thereof to represent different numbers by the various interconnections and means operated by the machine for coordinating said analyzing mechanism and said accumulating mechanism to cause the latter to automatically receive entries from a plurality of record columns concurrently and effect computations by shifting the circuit interconnections of the network.

20. A tabulating machine comprising analyzing means for searching a plurality of record columns concurrently for index points and for searching the index point positions of the columns successively, electrical entry receiving mechanism consisting of a series of circuits, one for each digit, for each denominational order, coordinating means intermediate the analyzing means and the entry receiving mechanism and cooperating with both to cause selective energization of the circuits of the entry receiving means according to record analysis by the analyzing means, and means, forming part of the entry receiving mechanism, operated by each circuit on energization thereof to connect the other circuits of its series to the analyzing means through the coordinating mechanism to cause selective energization of said other circuits according to subsequent analysis of a record by the analyzing means.

21. In a record controlled accounting machine, a plurality of multidenominational order entry receiving devices each including a series of relays, one for each digit, for each denominational order, each of which relays represents a different digit when energized, a plurality of circuits, one corresponding to each digit, common to all of said relays, record analyzing means for analyzing records and effecting electrical impulses timed according to the value of the digits in response to index points on the records being analyzed and automatic switching means for successively connecting said circuits to the analyzing means as index point positions for different digits are analyzed to cause each of said circuits to deliver the impulses corresponding to the digit which it represents to the relays.

MICHAEL MAUL.